United States Patent
Nakano

[19]

[11] Patent Number: 5,979,258
[45] Date of Patent: Nov. 9, 1999

[54] POWER SHIFTER CONTROL SYSTEM

[75] Inventor: Seiichi Nakano, Kanuma, Japan

[73] Assignee: Keihin Seimtsu Kogyo Co., Ltd., Kanagawa-ken, Japan

[21] Appl. No.: 09/042,157

[22] Filed: Mar. 13, 1998

[30] Foreign Application Priority Data

Apr. 18, 1997 [JP] Japan ................................ 9-116390

[51] Int. Cl.⁶ ................................................ F16H 59/00
[52] U.S. Cl. ............................................ 74/336 R; 74/335
[58] Field of Search ........................ 74/335, 336, 473.12, 74/473.14, 388 R

[56] References Cited

U.S. PATENT DOCUMENTS

| | | |
|---|---|---|
| 2,245,714 | 6/1941 | Price et al. . |
| 4,494,418 | 1/1985 | Bellah et al. ............................ 74/335 X |
| 4,911,031 | 3/1990 | Yoshimura et al. ........................ 74/335 |
| 4,981,202 | 1/1991 | Leigh-Monstevens et al. ........ 74/335 X |
| 5,151,637 | 9/1992 | Ninomiya et al. ......................... 74/335 |
| 5,357,820 | 10/1994 | Moroto et al. ............................ 74/335 |
| 5,832,777 | 11/1998 | Weilant .................................... 74/335 |

FOREIGN PATENT DOCUMENTS

| | | |
|---|---|---|
| 046845 A2 | 3/1982 | European Pat. Off. . |
| 0405550 | 1/1991 | European Pat. Off. .................. 74/335 |
| 545997 A1 | 6/1993 | European Pat. Off. . |
| 692658 A1 | 1/1996 | European Pat. Off. . |
| 755820 A2 | 1/1997 | European Pat. Off. . |
| 19548799 A1 | 6/1996 | Germany . |
| 5-139863 | 5/1993 | Japan . |
| 2270143 | 3/1994 | United Kingdom . |

OTHER PUBLICATIONS

Patent Abstracts of Japan, vol. 95, No. 2, Mar. 31, 1995 (abstract of JP 6–331024).

*Primary Examiner*—Charles A Marmor
*Assistant Examiner*—Roger Pang
*Attorney, Agent, or Firm*—Evenson, McKeown, Edwards & Lenahan

[57] ABSTRACT

A power shifter control system for transmitting shifting operation of a change lever (1) via shift cable (5) to a power shifter (2), which incudes a motor (3) for amplifying the transmitted shifting operation force and providing amplified shifting operation force to a transmission. The power shifter control system comprises a displacement sensor (6) for detecting displacement of the power shifter (2), and a controller (4) for controlling the driving of the motor (3) according to an output signal provided from the displacement sensor (6). The controller (4) includes a shifting speed detector (41) for calculating shifting speed according to an output signal provided from the displacement sensor (6), and a motor drive characteristic computer (42) for controlling the shifting force to be constant by increasing the rate of increase of driving force of the motor (3) with increasing shifting speed calculated in the shifting speed calculator (41). Shifting force can always be held constant irrespective of changes in the speed of the shifting operation of the change lever (1). A shift operation controller (46) prevents erroneous shifting operation. A shift suitability controller (53) is provided for interrupting power supply to a motor within a predetermined period of time after the end of shifting operation.

9 Claims, 10 Drawing Sheets

POWER SHIFTER CONTROL SYSTEM

BACKGROUND OF THE INVENTION

This invention relates to power shifter controllers for controlling the operation of power shifters, which are used for transmission of cars or like vehicles for amplifying shifting action from change levers and transmitting the amplified shifting action to the transmission.

A car or like vehicle uses a power shifter having shift operation system, which provides shifting action coupled from a change lever (or a shift lever) via a shift cable to the power shifter, whereat amplifies said shift operation force with drive force of an electric motor and transmits the amplified shifting action force to a transmission.

FIG. 9 shows the relation between synchro load L on the transmission and synchro time t thereof in the operation of such a power shifter. As shown in the curve, in this power shifter the synchro load L varies with synchro time t in inverse proportion to the synchro time t. With reduction of the synchro time t, the power shifter performs faster shifting, and the synchro load L is increased. In the converse case, the synchro load is reduced.

The above power shifter, however, is required to always ensure shifting action with a constant shifting force under the above transmission characteristic. Hitherto, however, no technique which can perfectly meet such demand has been proposed.

In addition, the above prior art power shifter is subject to a commonly termed over-run phenomenon, i.e., a phenomenon that the rotational rate of the engine is increased beyond a permissible rotational rate range when a shifting action from a high to a low speed change stage is caused.

The above prior art power shifter has a further problem that a sensor may remain operative even after shifting action caused by change lever has been over. In such a case, unnecessary power is supplied to the electric motor, resulting in wasteful power consumption and possible damages to motor and drive components.

SUMMARY OF THE INVENTION

A first object of the invention is to provide a power shifter control system, which can always ensure a constant shifting force under any shifting condition, as well as permitting reduction of the shifting force and realization of satisfactory shifting without swerving from normal sense of operation.

The second object of the invention is to eliminate over-run of the engine due to erroneous speed change stage selection or the like when a down-shifting action from a high to a low speed change stage is caused by the change lever.

A further third object of the invention is to prevent unnecessary power supply to the electric motor so as to eliminate wasteful power consumption and possible damages to motor and drive components, after shifting action caused by change lever has been over.

The invention is provided to attain the above objects.

A first feature of the invention resides in a power shifter control system for controlling the operation of a power shifter (2) which transmits a shifting action coupled from a change lever (1) via a shift cable (5) to a power shifter (2), and provides the amplified shifting action force with a motor (3) of the power shifter (2) to the transmission, which power shifter control system comprises a displacement sensor (6) for detecting displacement of the power shifter (2), and a controller (4) for controlling the driving of the motor (3) according to an output signal provided from the displacement sensor (6), the controller (4) including a shifting speed detector (41) for calculating shifting speed according to the output signal provided from the displacement sensor (6), and a motor drive characteristic computer (42) for controlling the shifting operation force to be constant by increasing the rate of increase of driving force of the motor (3) with increasing shifting speed calculated in the shifting speed detector (41).

According to a first feature of the invention, the motor drive characteristic computer (42) in the controller (4) quickly increases the output of the power shifter (2) by increasing the rate of increase of driving force of the motor (3) with increasing shifting operation speed of the change lever (1), in other words, so that the rate of increasing of driving force of the motor and output of the power shifter correspond to the shifting operation speed.

In this way, the operation force of change lever (1) is always fixed even though shifting operation speed might be varied, thus it is possible to realize a good shifting operation which operation force is decreased.

A second feature of the invention resides in a power shifter control system, which comprises a shift position sensor (10) for detecting a shift position of shifting operation by the power shifter (2), a select sensor (13) for detecting a select position selected by a select lever (15), a transmission rotational rate detector (12) for detecting rotational rate of the transmission, an engine rotational rate detector (14) for detecting engine rotational rate, and a controller (4) for controlling the driving of the motor (3) according to an output signal provided from the shift position sensor (10), the select sensor (13), the transmission rotational rate detector (12) and the engine rotational rate detector (14), and the controller (4) includes a possible down-shifting speed change stage number range calculator (45) for calculating a possible down-shifting speed change stage number range in a permissible engine rotational rate range according to the transmission rotational rate, the engine rotational rate and output signals of the shift position sensor (10) and select sensor (13) representing a shifted speed change stage, and a shift operation controller (46) for providing a shift operating force in the direction opposite to shifting direction to the motor (3) via a motor drive portion (47) thereof when the shifted speed change stage detected by the shift position sensor (10) and the selector sensor (13) is not in the possible down-shifting speed change stage number range but in the another speed change stage.

According to the second feature of the invention, the shift operation controller (46) checks, according to the output signal representing the shifted speed change stage, as to whether the shifted speed change stage is in the possible down-shifting speed change stage number range in the engine rotational rate range, which is calculated according to the transmission rotational rate, engine rotational rates and the speed reduction ratio of the transmission.

When the result of the check is not in the range, the motor drive portion (47) drives the motor (3) in the direction opposite to shifting direction, thus preventing erroneous shifting operation to prevent over-run of the engine.

A third feature of the invention resides in a power shifter control system, which comprises a displacement sensor (6) for detecting displacement of the power shifter (2), a shift position sensor (10) for detecting a shift position brought about by the power shifter (2), and a controller (4) for controlling the driving of the motor (3) according to an output signals provided from the sensors (6) (10), the controller (4) including a shift suitability controller (53) for checking whether the displacement sensor (6) has been operative in a predetermined period of time after the end of shifting operation by comparing the instant of the end of shifting operation detected by the shift position sensor (10) and the instant of the end of operation of the displacement sensor (6), and a motor drive portion (47) for interrupting power supply to the motor (3) for a predetermined period of time when the shift suitability controller (53) determines that the sensor has been operated.

According to the third feature of the invention, the power supply to the motor (3) is interrupted when the shift suitability controller (53) is determined that the displacement sensor (6) has been operative in a predetermined period of time after the end of shifting operation detected by the shift position sensor (10).

Thus, it is possible to avoid wasteful power consumption and prevent damages to the mother (3) and other components.

A fourth feature of the invention resides in a power shifter control system, which comprises a sensor operation detector (54) for providing a motor drive on-off signal according to an output signal provided from the sensor (6), and a motor drive headquarter (55) for providing a motor drive signal to a motor drive portion (47) and also starting a timer (11) in response to a motor drive "on" signal provided from the sensor operation detector (54), and stopping the motor (3) by providing a motor stop signal to the motor drive portion (47) after the lapse of a predetermined period of time from the instant of detection of a signal from the timer (11) even when a signal from the displacement sensor (6) has not been restored to be in a motor drive "off" signal range.

According to the fourth feature of the invention, the motor drive headquarter (55) supplies a motor drive signal to the motor drive portion (47) and also starts the timer (11) in response to a motor drive "on" signal. Thus, even when a signal from the displacement sensor (6) has not been restored to be in a motor drive "off" signal range, the motor drive headquarter (55) supplies a motor stop signal to the motor drive portion (47) to stop the motor (3) after the lapse of a predetermined period of time from the instant of detection of a signal from the timer (11), the motor drive stops compulsorily thereby. It is thus possible to prevent wasteful power consumption and damages to the motor and other components.

A fifth and a sixth feature of the invention reside in combinations of the above first to the fourth feature of the invention and an invention in Japanese Patent Application No. 5-139863 filed by the applicant of the present application.

Specifically, the fifth feature of the invention resides in a power shifter control system according to the first to the fourth invention, which comprises an electric motor (3), a speed reducer (22) directly coupled to the electric motor (3), a pinion (23) directly coupled to an output shaft of the speed reducer (22), a power rod (24) having a rack (25) meshed with the pinion (23), a control rod (29) extending parallel to the power rod (24), a return spring (74) for returning the control rod (29) to a central position thereof, and a lever (27) mounted on both ends of the control rod (29) and power rod (24), and having a shift cable mounting part (27a) connected to the shift cable (5), the sensor (6) being operative to detect displacement of the control rod (29).

The sixth feature of the invention resides in the power shifter control system according to the first to fourth features of the invention, which comprises an electric motor (3), speed reducer (22) directly coupled to the electric motor (3), a pinion (23) directly coupled to an output shaft of the speed reducer (22), a hollow power rod (78) having a rack (25) meshed with the pinion (23), a control rod (29) mounted in the inner surrounding of said power rod (78), a return spring (74) mounted on the power rod (78) for returning the control rod (29) to a central position thereof, and a lever (80) mounted on an end of the control rod (29) and having a shift cable mounting part (80a), the sensor (6) being operated to detect displacement of the control rod (29).

With the constructions described above according to the invention, the following effects are obtainable.

(1) It is possible to obtain a drive force of the motor (3) and a rate of increase Of the speed of the power shifter (2) in correspondence to the shifting speed of the change lever (1). Thus, it is possible to always ensure a constant shifting force and obtain shifting operation without excessive shifting force and with a satisfactory sense of shifting.

(2) When down-shifted speed change stage is not in a permissible rotational rate change set according to the rotational rate of the engine, the motor (3) can be driven in the direction opposite to shifting operation, and it is thus possible to avoid erroneous shifting operation and prevent over-run of the engine.

(3) After the end of shifting operation, the motor (3) is not energized, and it is thus possible to prevent wasteful power consumption and damages to the motor (3) and other components.

BRIEF DESCRIPTION OF THE DRAWINGS

FIG. 2 is a sectional view showing a first example of power shifter, which the invention is applied to;

FIG. 3 is a sectional view showing a second example of power shifter, which the invention is applied to;

FIG. 9 is a graph showing a characteristic of a transmission, which the invention is applied to;

DETAILED DESCRIPTION OF THE PREFERRED EMBODIMENTS

Preferred embodiments of the invention will now be described in detail with reference to the drawings.

Figure 1:
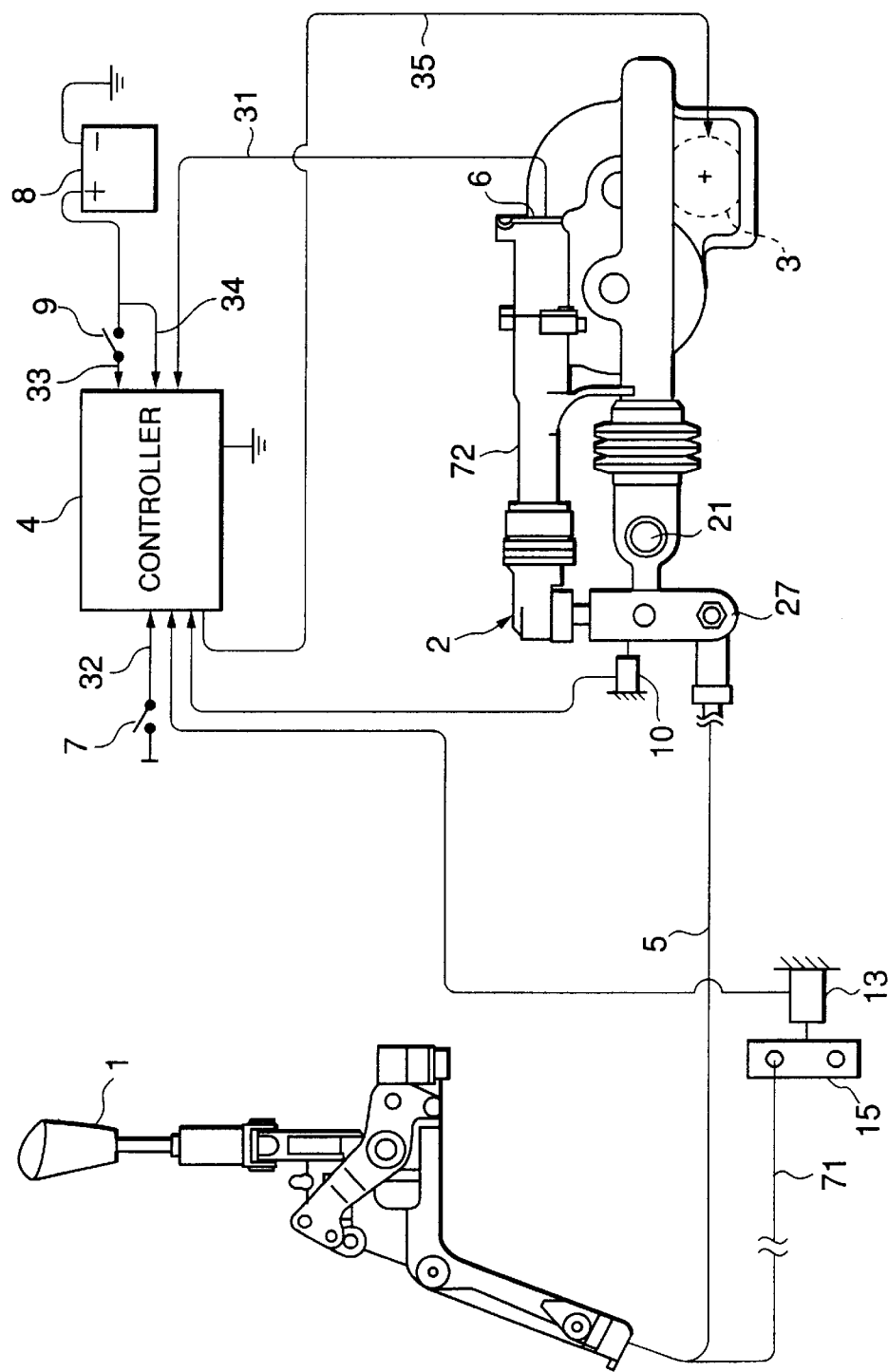
FIG. 1 is a view showing the overall construction of embodiments (i.e., first to fourth embodiments) of the power shifter control system according to the invention.

Referring to FIG. 1, reference numeral 1 designates a change lever (or shift lever) for speed change operation, 2 a power shifter, and 5 a shift cable connecting an operating end of the change lever 1 and a lever 27 as an input end of the power shifter 2.

Reference numeral 6 designates a sensor which is mounted on the power shifter 2 and detects displacement thereof, and 4 a controller for controlling the driving of an electric motor (hereinafter referred to as motor) 3 mounted on the power shifter 2.

Reference numeral 31 designates an electric line for supplying an output signal from the sensor 6 mounted on the power shifter 2 to the controller 4. Reference numeral 7 designates a clutch switch, 8 a battery, and 9 an ignition switch, these electric components being connected via electric lines 32, 33 and 34, respectively, to the controller 4.

The controller 4 supplies a control output via an electric line 35 to the motor 3. Reference numeral 10 is a shift position sensor, 13 a select sensor, and 15 a select lever.

Figure 2:
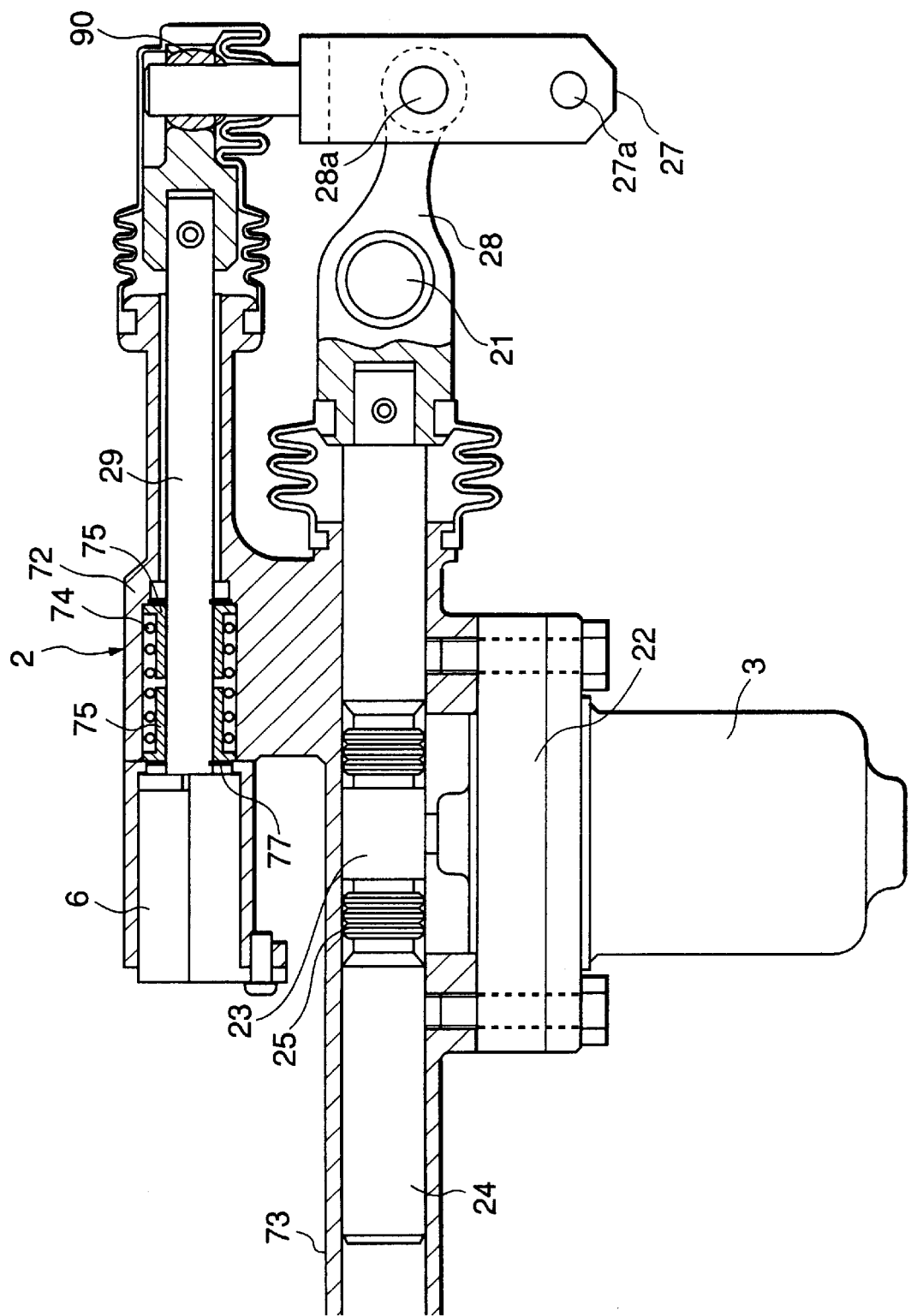

FIG. 2 shows an example of the power shifter 2 in detail. Referring to the Figure, reference numeral 3 designates the electric motor. Reference numeral 22 designates a speed reducer, for instance a planetary gear speed reduction unit, directly coupled to the drive motor 3. Reference numeral 23 is a pinion, which directly coupled to an output shaft of the speed reducer (22). Reference numeral 24 designates a power rod being formed club-shaped and axially movable. Reference numeral 25 designates a rack formed on the outer periphery of the power rod 24 and meshed with a pinion 23. Reference numeral 73 designates a casing supporting the whole power shifter structure. Reference numeral 21 designates an output section provided on an end of the power rod 24, and 28 a holder mounted on the output section 21. Reference numeral 29 designates a control rod supported in a control rod box 72 integral with the top of the casing 73 and extending parallel to the power rod 24. Two flanged cylindrical spring seats 75 are loosely disposed between the control rod 29 and the control rod box 72 such that their ends opposite flanged ends face each other. The flanges of the spring seats 75 have their outer end faces in contact with snap rings 77 fitted on the control rod 29 and their peripheral surfaces in contact with stepped surfaces of the control rod 29.

Reference numeral 74 designates a spring fitted with a predetermined mounting load between the two spring seats 75. Reference numeral 27 designates a lever which is coupled by a pin 28a to a holder 28 and also coupled for rocking and axial displacement by a well-known spheric universal joint 90 to an end of the control rod 29. The lever 27 has a shift cable mount 27a mounted on its opposite end against the control rod 29. The shift cable 5 noted above is mounted on the shift cable mount 27a.

Figure 3:
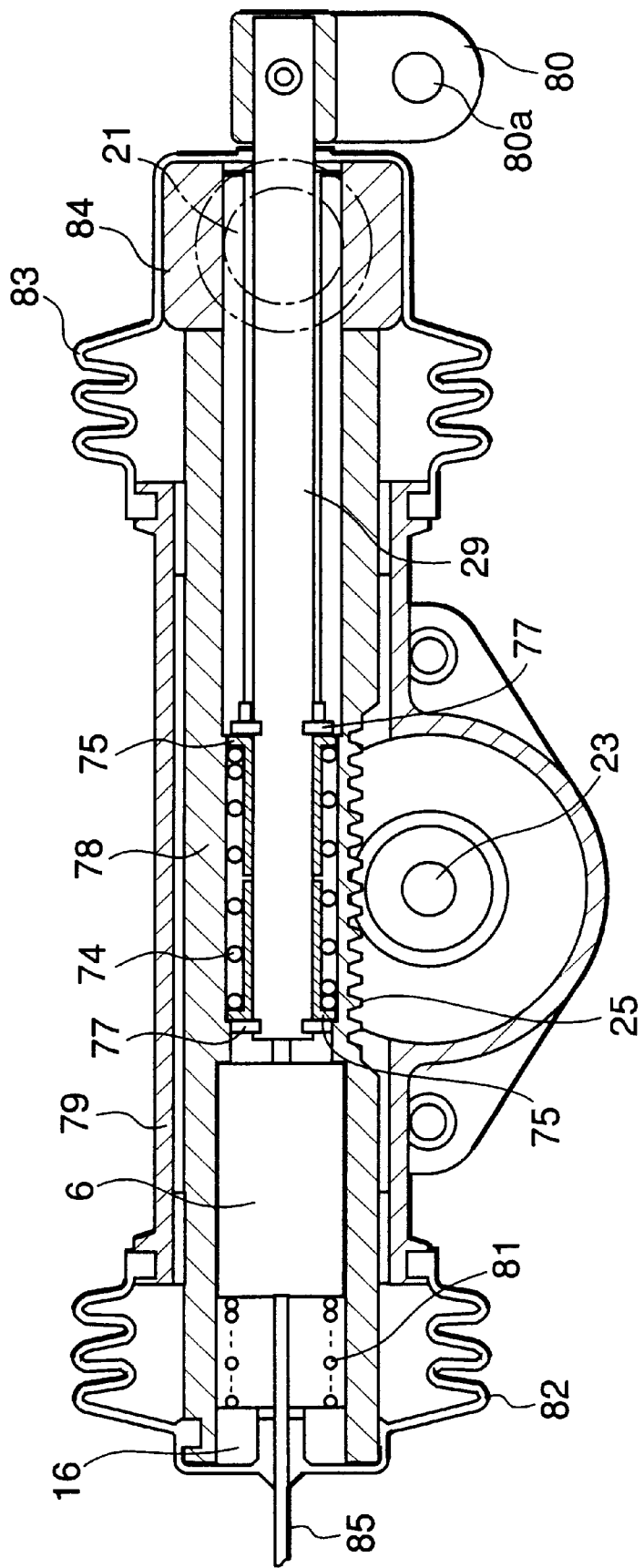
Figure 4:
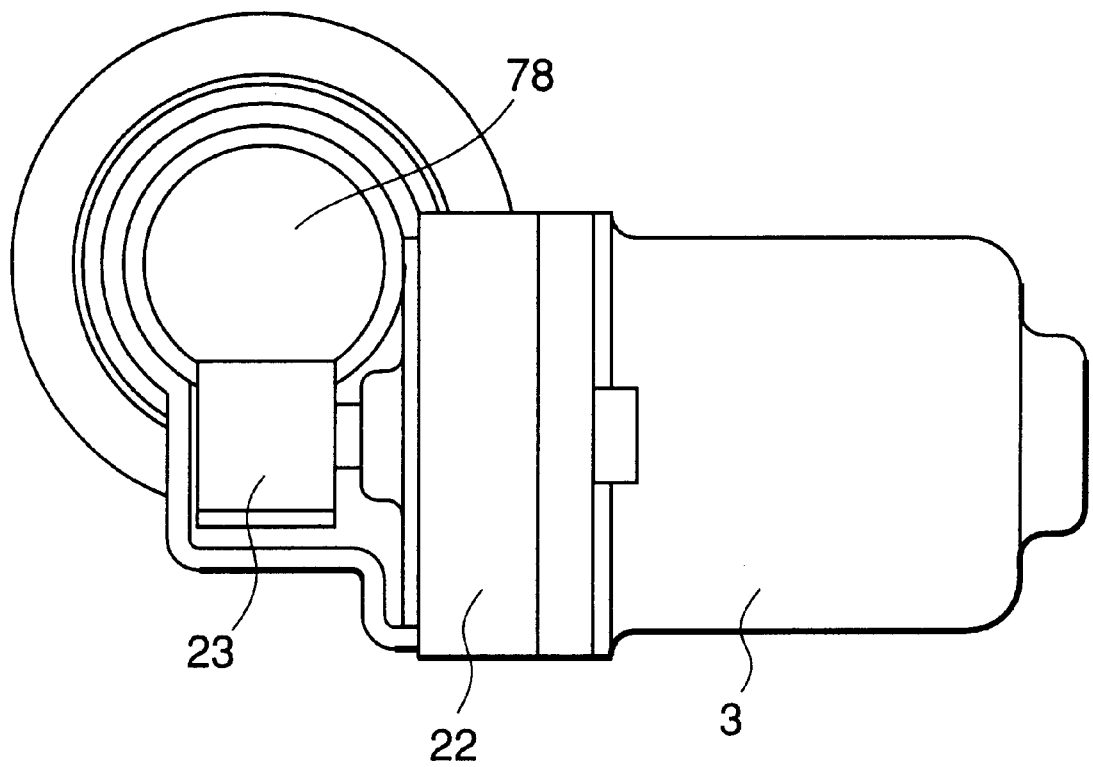
FIG. 4 is an elevational view showing the second example of power shifter.

FIGS. 3 and 4 show a different example of the power shifter 2. Referring to the figures, reference numeral 79 designates a casing, and 78 a power rod. The power rod 78 is hollow, and is supported for axial displacement by bellows 82 and 83 on the casing 79. Reference numeral 29 is a control rod, which extends in the inner space of the power rod 78 and is held at a central position thereof by elastic force of a spring 74 to be described later.

Two flanged hollow cylindrical spring seats 75 are interposed between the outer periphery of the control rod 29 and the inner periphery of the power rod 78 such that their flanged opposite ends face each other backing on their flange respectively.

The spring seats 75 have their flanges locked by snap rings 77 fitted on the control rod 29. Reference numeral 74 is a spring fitted with a predetermined mounting load provided thereto in the two spring seats 75.

Reference numeral 6 designates a displacement sensor, which is disposed in the inner space of the power rod 78 and coupled to a shaft end of the control rod 29, and detects displacement thereof.

Reference numeral 85 is an electric line for taking out an output signal of the sensor 6. Reference numeral 16 designates a plug closing a shaft end of the hollow power rod 78, and 81 a spring, which is interposed between the plug 16 and the sensor 6 and mounted with a predetermined mounting load provided to it.

The power rod 78 has a rack 25 formed in its outer periphery and meshed with a pinion 23 mounted on an output shaft of the speed reducer 22.

Reference numeral 80 designates a lever secured to an end of the control rod 29 and having a shift cable mount 80a with the shift cable 5 mounted thereon.

Reference numeral 84 designates a holder, which is mounted on an end of the power rod 78, and on which an output section 21 of the power rod 78 is mounted.

In the power shifter 2 shown in FIGS. 3 and 4, in the free state of the spring 74, the flanges of the spring seats 75 on the outer sides thereof, are in contact with inner peripheral stepped surfaces of the power rod 78, and the snap rings 77 secured to the control rod 29 are in contact with the both sides' flanges of the spring seats 75. In this state, the control rod 29 is at a central position, and the motor 3 is stationary. When the shift cable mount 80a is moved from this state by applying a force in either direction to it via the shift cable 5, the lever 80 is moved in the same direction as the direction of the applied force while the power rod 78 remains stationary. As a result, the control rod 29 pushes one of the spring seats 75. This spring thus turns to be moved while being compressed. The sensor 6 detects this displacement of the control rod 29, whereupon it starts the motor 3 by applying a voltage thereto via the electric line 85.

The drive force of the motor 3 is coupled via the speed reducer 22, the pinion 23 and the rack 25, and a force in the same direction as the direction of the shifting force applied to the shift cable mount 80a is applied to the power rod 78. This force is coupled via the holder 84 to the output section 21, which is directly coupled to a transmission (not shown), thus increasing the shifting force applied to the shift cable 5. The coupled force causes a displacement of the power rod 78 in the same direction as the force applied to the control rod 29, and thus it acts in the direction of cancel the relative displacements of the control rod 29 and the power rod 78. The control rod 29 is thus returned to the initial position. The sensor 6 detects this displacement, and controls the motor 3 in an operation as will be described.

Operation of embodiments shown in FIGS. 1 through 8 will now be described.

In the first place, the operation the power shifter shown in FIG. 2 will be described. In the inoperative state of the change lever 1 shown in FIG. 1, the spring 74 is in its extended state as shown in FIG. 2. In this state, the flanges of the spring seats 75 are in contact with the inner peripheral stepped surfaces of the control rod box 72, and are in contact with the snap rings 77 fitted on the control rod 29. The control rod 29 is thus held at the central position and the motor (3) is stationary.

When the lever 27 is moved from this state by the change lever (see FIG. 1) via the shift cable 5, the control rod 29 is displaced as fulcrum the pin 28a coupled to the holder 28, thus compressing the spring 74. The sensor 6 detects this displacement of the control rod 29, whereupon a voltage is applied to the motor 3 via the controller 4 shown in FIG. 1 (as will be described later in detail), thus driving the motor 3.

The rotation of the motor 3 is decelerated by the speed reducer 22 and converted via the pinion 23 and rack 25 to a reciprocal motion. The power rod 24 and output section 21 secured to the rack 25 are thus displaced in the same direction as the shifting force applied to the shift cable 5. In this way, shifting force increased by motor 3 is transmitted to the transmission coupled to the output section 21. At the same time, the force due to the displacement of the power rod 24 displaced by the motor 3 acts in the direction of canceling the relative displacements of the control rod 29 and the power rod 24. As a result, the control rod 29 is returned to the initial position.

Figure 5:
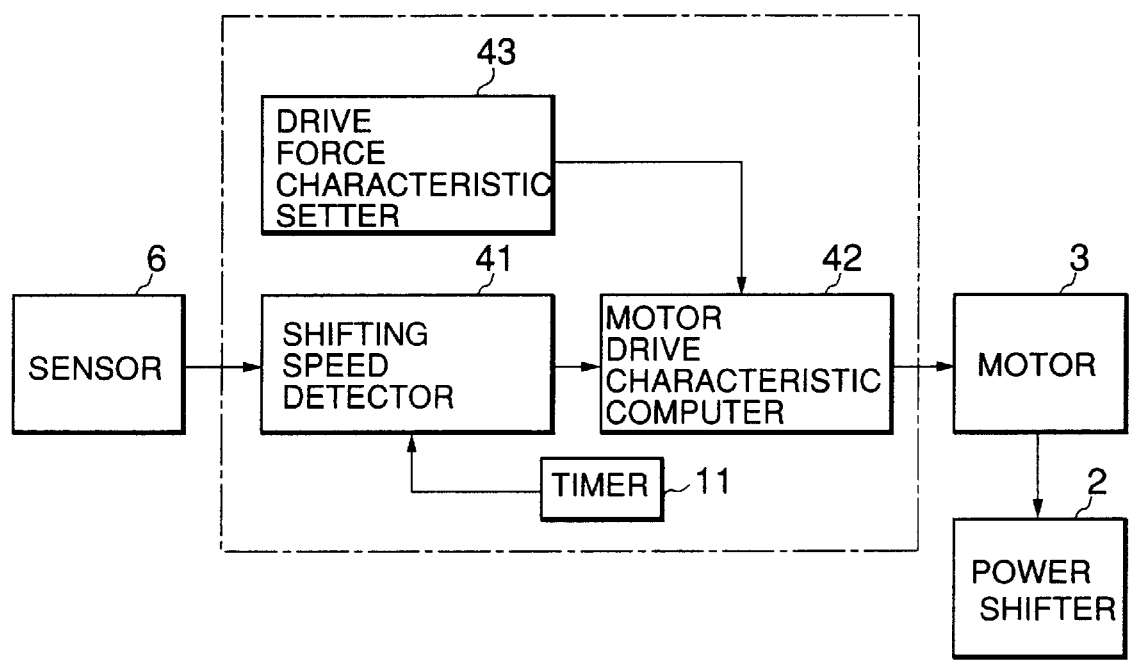
FIG. 5 is a block diagram showing a first embodiment of the power shifter control system according to the invention.

FIG. 5 is a block diagram showing a first embodiment of the power shifter control system according to the invention. The operation of this embodiment will now be described with reference to FIGS. 1, 2 and 5.

Figure 9:
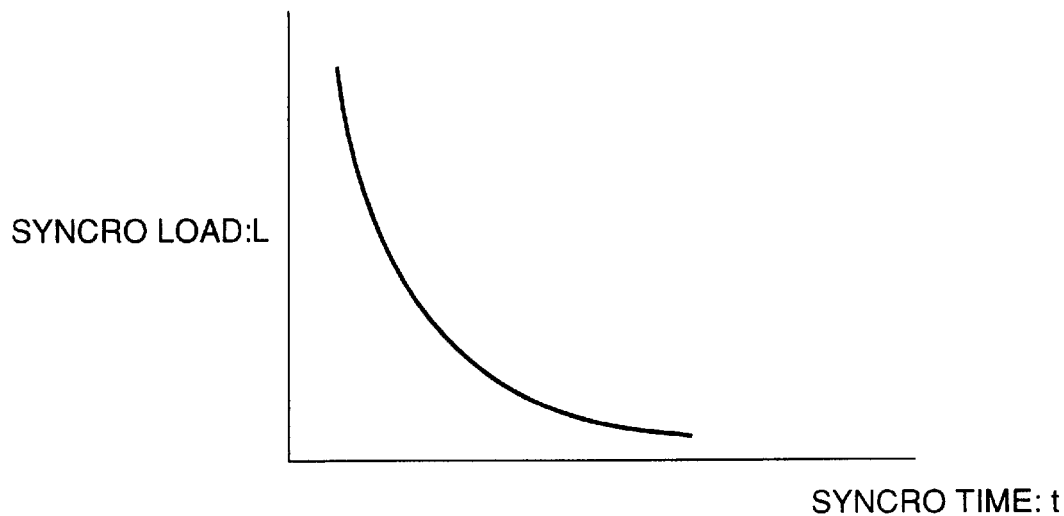

FIG. 9 shows a syncro load characteristic of a transmission, which a motor-driven power shifter and a control system therefor according to the invention are applied to. As shown, synchro load L is varied in inverse proportion to synchro time t. That is, the synchro load L is increased by reducing the synchro time t with fast shifting, and reduced by increasing the synchro time t with slow shifting.

In this motor-driven power shifter 2, shifting should always be made with a constant shifting force under the above transmission characteristic. To meet this requirement, in the first embodiment of the invention the shifting speed is detected before driving the motor 3, and a drive force characteristic adapted to the detected shifting speed is provided to the motor 3.

Referring to FIG. 5, reference numeral 6 designates the sensor, which detects displacement of the control rod 29 of the power shifter 2 as shown in FIGS. 1 and 2.

Figure 10:
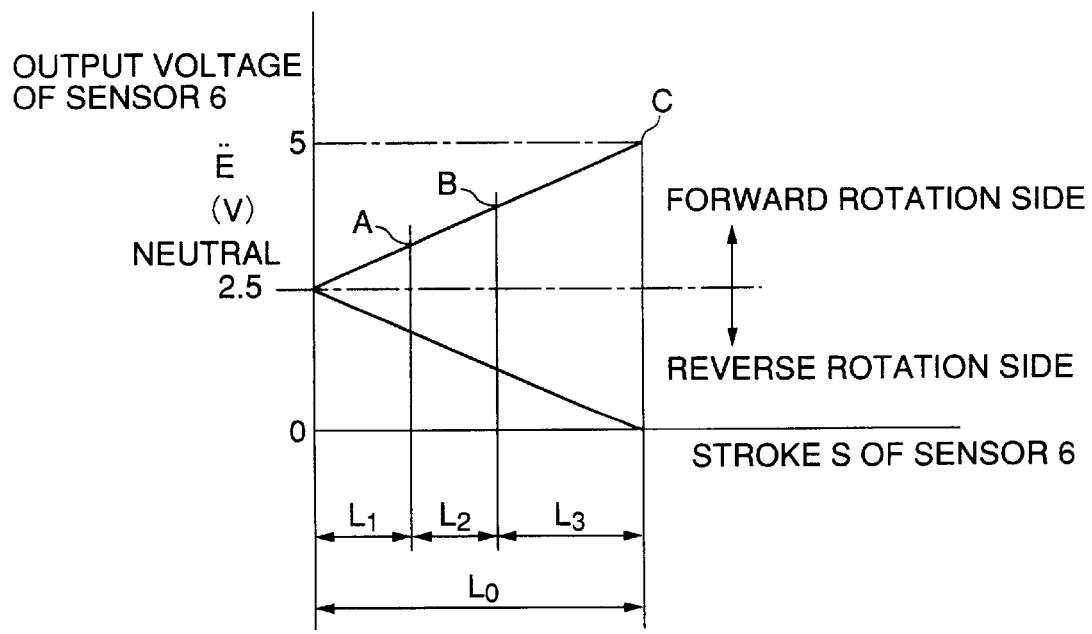
FIG. 10 is a graph showing an example of sensor characteristic of the embodiments of the invention.

FIG. 10 is a graph showing an example of characteristic of the sensor 6. In the graph, the ordinate is taken for the output voltage of the sensor 6, and the abscissa is taken for the stroke of the sensor 6.

The sensor 6 provides output voltage E set to 2.5 V when it is not shifted by the change lever 1, i.e., at its neutral position (at which the sensor stroke S is zero), and it begins its displacement with start of shifting operation. The motor 3 is "off" during stroke interval L1 up to point A in FIG. 10, the shifting speed is detected during stroke interval L2, and the motor 3 is held "on" during stroke interval L3.

The output voltage E of the sensor 6 is increased symmetrically on the sides of the forward and reverse rotations of the motor 3 and in proportion to the sensor stroke S.

The sensor 6 having the above characteristic detects displacement of the control rod 29 during the stroke interval L2.

Referring to FIGS. 5 and 1, the sensor 6 is displaced with displacement of the control rod 29 caused by shifting operation of the change lever 1, and a shifting speed detector 41 in the controller 4 detects displacement of the sensor 6.

The timer 11 measures the time taken for the displacement of the sensor 6, and supplies to the shifting speed detector 41 the data representing time from instant A to instant B in FIG. 10, i.e., the period during which the shifting speed of sensor 6 is calculated. The shifting speed detector 41 calculates shifting operation speed v (v=s1/t1) from shifting displacement s1 of the control rod 29 as obtained from the sensor 6 and shifting time t1 measured by the timer 11.

Figure 11:
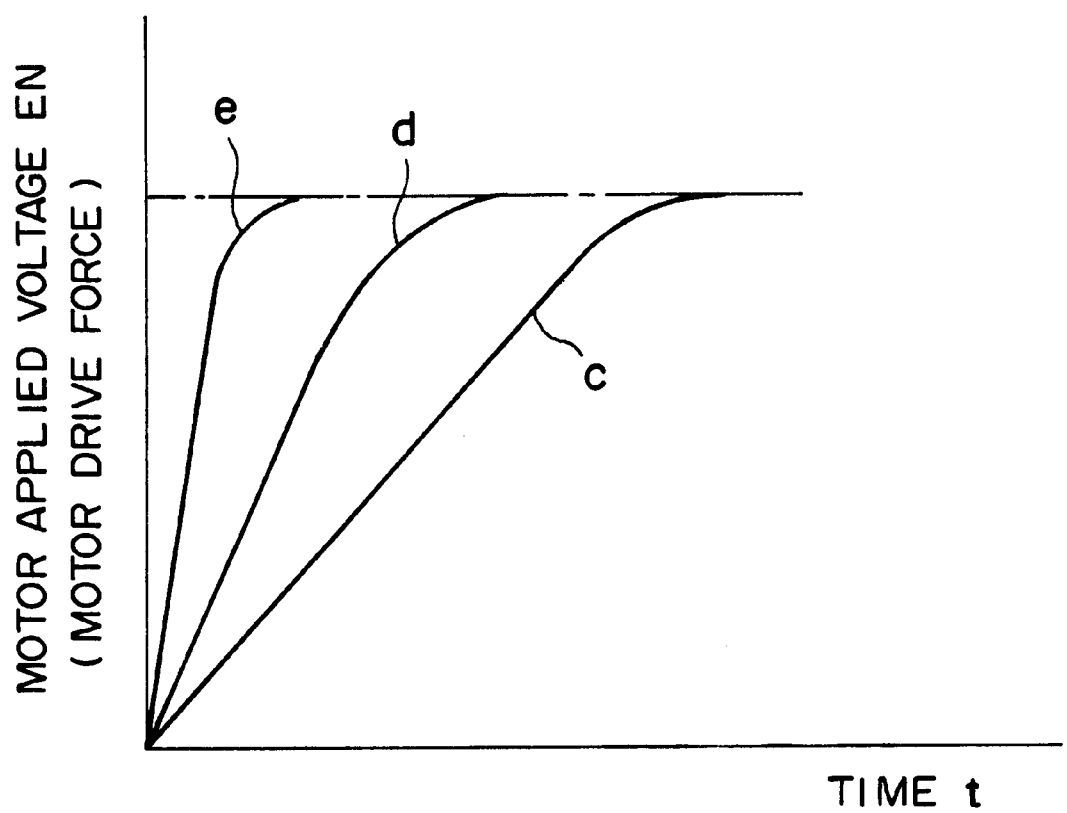
FIG. 11 is a graph showing an example of electric motor characteristic of the embodiments of the invention.

A drive force characteristic setter 43 sets a drive force characteristic of the motor 3, i.e., a drive force characteristic of motor drive force versus shifting operation speed as shown in FIG. 11. Referring to FIG. 11, the setter 43 sets characteristic e when the shifting operation speed v is highest, and sets characteristics d and c with successive reduction of the shifting operation speed v. When the shifting operation speed is increased with fast shifting operation made by the change lever 1, voltage EN applied to the motor 3 is quickly increased as shown by the curve e in FIG. 11. With reduction of the shifting operation speed v, increase of the voltage EN becomes progressively slower as shown by the curves d and c.

A motor drive characteristic computer 42 provides a motor drive signal having a motor drive force characteristic as shown in FIG. 11, provided from the drive force characteristic setter 43, according to the shifting operation speed v calculated in the shifting speed detector 41. That is, when the shifting operation speed v is highest, the motor drive characteristic computer 42 supplies to the motor 3 a motor drive signal corresponding to the maximum rate of increase speed of the drive force of (i.e., voltage applied to) the motor 3 according to the characteristic e in FIG. 11.

In this case, the drive force of the motor 3 transmitted to the power shifter 2 is quickly increased, and shifting force, which is quickly increased in a short period of time corresponding to high shifting speed of the change lever 1, is outputted from the output section 21 to the transmission.

In this way, when the motor drive characteristic computer 42 is made on gentler shifting operation (i.e., when the shifting operation speed v is middling), the motor drive characteristic d in FIG. 11 is provided. When still gentler shifting operation is made (i.e., when the shifting operation speed v is still lower), the motor drive characteristic c in FIG. 11 is provided. It is possible to realize continuous variation of the characteristics e to c from one another.

It is to be appreciated that, in this embodiment, the output of the power shifter 2 is quickly increased by increasing the rate of speed increase of the drive force of the motor 3 in correspondence to shifting operation speed increase of the change lever 1, that is, motor drive force and power shifter output increase rate are provided in correspondence to the shifting operation speed. It is thus possible to always ensure a constant shifting force of the change lever 1 irrespective of changes in the shifting operation speed.

Figure 6:
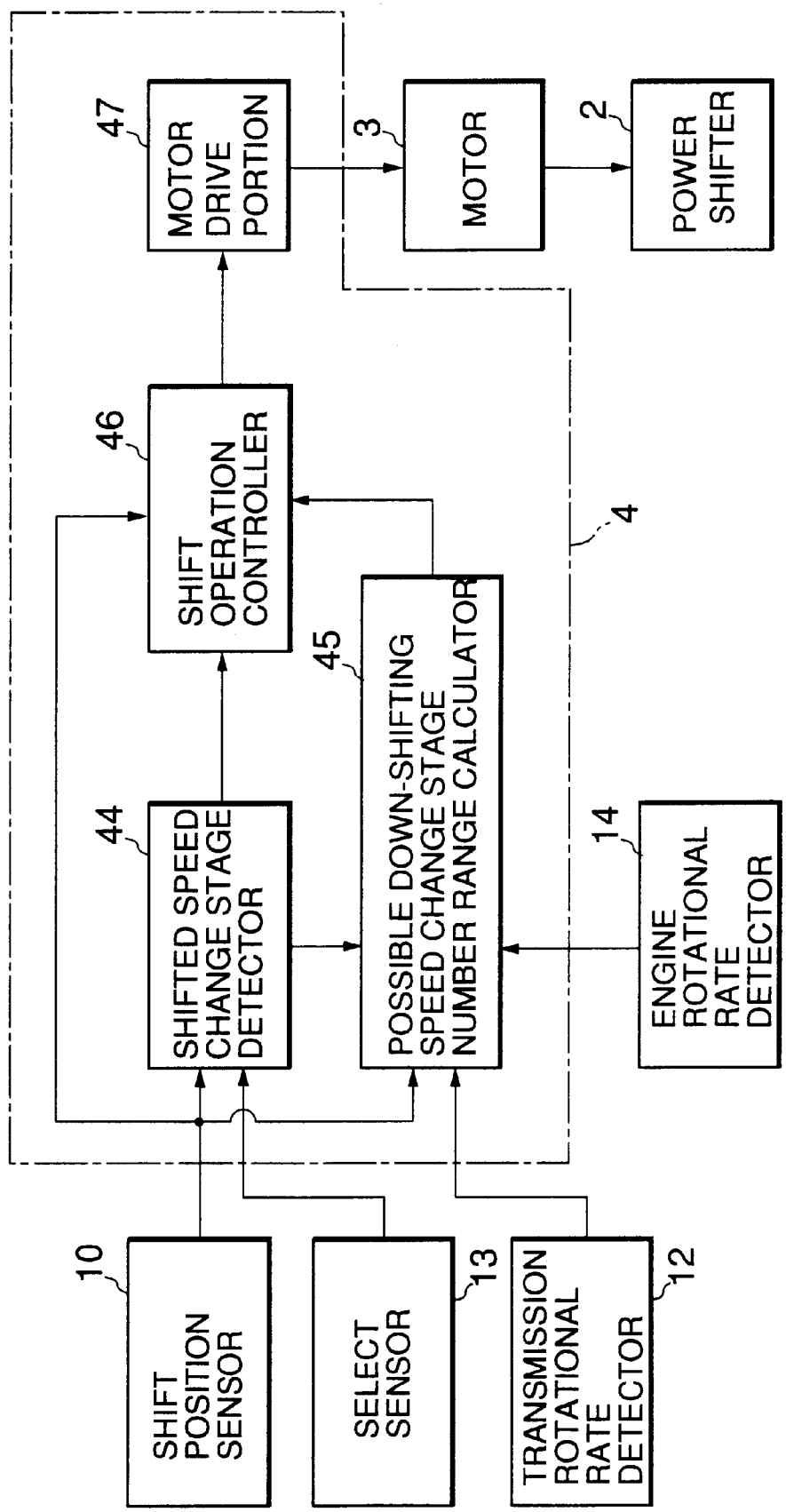
FIG. 6 is a block diagram showing a second embodiment of the power shifter control system according to the invention.

FIG. 6 is a block diagram showing a second embodiment of the power shifter control system according to the invention. This embodiment seeks to prevent over-run of the engine in shifting (i.e., down-shifting) from a high to a low speed change stage of the transmission. A shift position sensor detects a shift position, and a select sensor detects a select position. A shifted speed change stage is detected from signals representing the detect shift and select positions. A possible down-shifting speed change stage number range in a permissible engine rotational rate range, is calculated from the output rotational rate of the speed change stage and the speed reduction ratio of the transmission. When shifting operation is made to an impossible down-shifting speed change stage, a drive force of a motor is acted in the direction opposite to the shifting direction, thus forcibly avoiding erroneous shifting operation.

Referring to FIG. 6, reference numeral 10 designates a shift position sensor 10 for detecting a shift position brought about by the power shifter 2, and 13 a select sensor 13 for detecting a speed change stage position selected by the select lever. A shifted speed change stage detector 44 detects a shifted speed change stage brought about by shifting operation from output signals of the sensors 10 and 13 representing the detected positions noted above, and supplies an output representing the detected speed change stage position to a possible down-shifting speed change stage number range calculator (hereinafter referred to as speed change stage number range calculator) 45 and also to a shift operation controller 46.

Reference numeral 12 designates a transmission rotational rate detector for detecting the rotational rate of the output shaft of the transmission, and 14 an engine rotational rate detector for detecting the rotational rate of the engine. The outputs of the transmission and engine rotational rate detectors 12 and 14 representing the rotational rates of the transmission and the engine, respectively, are supplied to the possible down-shifting speed change stage number range calculator 45.

The possible down-shifting speed change stage number range calculator 45 calculates the number of possible down-shifting speed change stages, in which the rotational rate of the engine is within a permissible rotational rate, from the speed reduction ratio of the transmission, the rotational rates of the transmission output shaft and the engine, and the shifted speed change stage.

The shift operation controller 46 checks whether the shifted speed change stage detected by the shifted speed change stage detector 44 is within the range of the possible down-shifting speed change stage number range calculated by the speed change stage number range calculator 45, and supplies the result of the check to a motor drive portion 47. The calculation and check of the possible down-shifting speed change stage number and the determination of the timing of providing the result of the check, are made according to the output signal of the shift position sensor 10 applied to the speed change stage number range calculator 45 and the shift operation controller 46.

When the result of the check is not within the range noted above, the motor drive portion 47 supplies a signal to the motor 3 such that the motor 3 experiences a drive force in the opposite direction to the direction of shifting by the power shifter 2, thus driving the motor 3 in the opposite direction. Consequently, the power shifter 2 is operated in the opposite direction to the direction of shifting operation, thus preventing erroneous operation and consequent overrun of the engine.

As a modification of the second embodiment (FIG. 6), it is possible to arrange such that when the shift operation controller 46 determines that the shifted speed change stage is not in the possible down-shifting speed stage number range, the motor drive portion 47 supplies a stop signal to the motor 3 and stops the motor 3, thus increasing the resistance offered to the shifting operation as an erroneous operation alarm to the driver.

Figure 7:
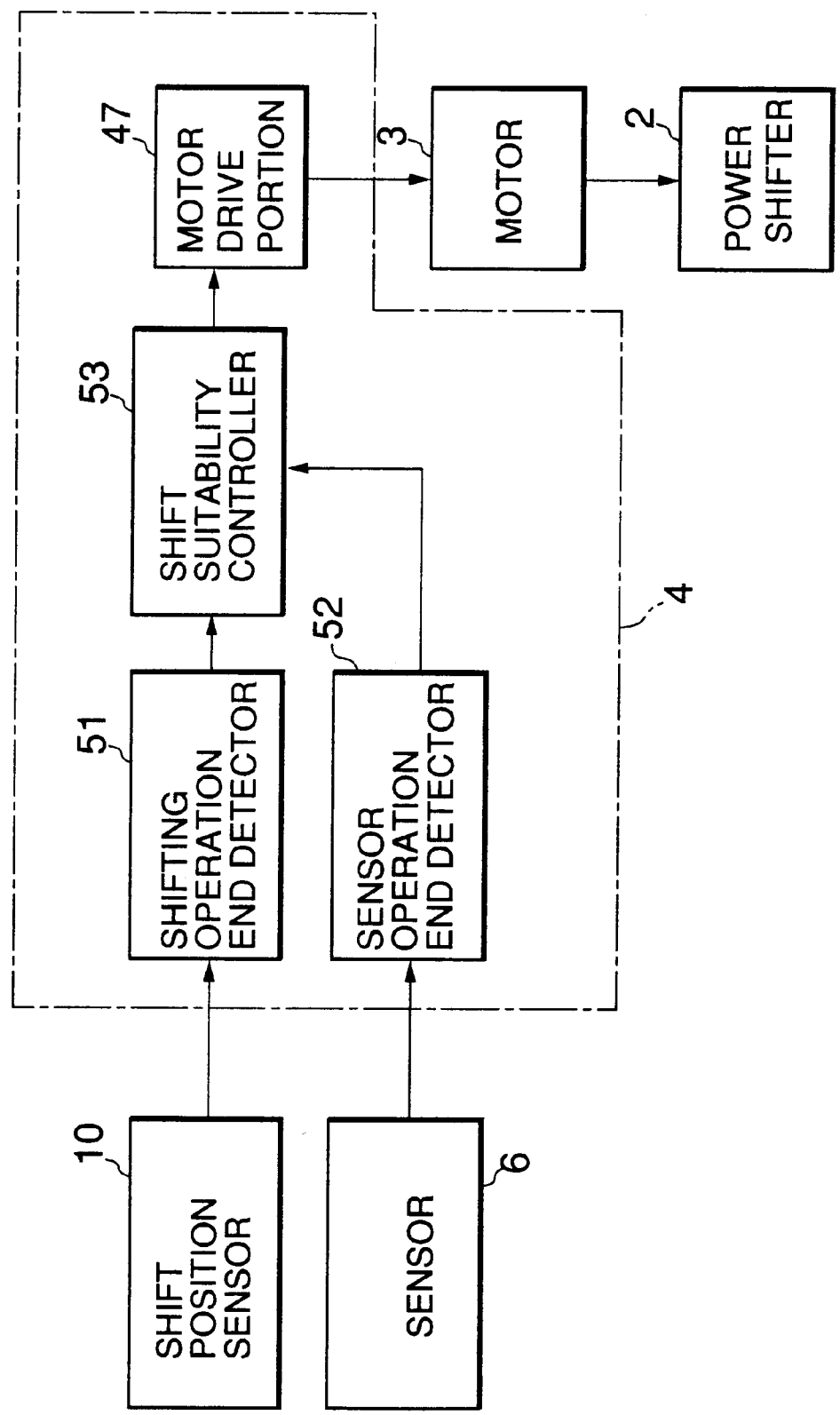
FIG. 7 is a block diagram showing a third embodiment of the power shifter control system according to the invention.

FIG. 7 is a block diagram showing a third embodiment of the power shifter control system according to the invention. In this embodiment, when the sensor is operative even after shifting operation, the time of continuous power supply to a motor is limited, thus preventing unnecessary power consumption.

Referring to FIG. 7, reference numeral 10 designates a shift position sensor like that in the second embodiment, and 6 a sensor in the power shifter 2 (FIG. 1). Output signals of the shift position sensor 10 and sensor 6 are supplied to a shifting operation end detector 51 and a sensor operation end detector 52.

The shifting operation end detector 51 detects the end of shifting operation of the power shifter 2, and the sensor operation end detector 52 detects the end of stroke (or operation) of the sensor 6.

Output signals of both the detectors 51 and 52 are supplied to a shift suitability controller 53. The shift suitability controller 53 checks whether the sensor 6 is operating when the time difference between the times of the shifting operation end signal and the stroke end signal, supplied from the detectors 51 and 52 respectively, is longer than a predetermined period of time, that is, when a predetermined period of time has been passed after the end of shifting operation, and supplies the result of the check to a motor drive portion 47.

When the time difference is longer than a predetermined period of time, that is, when the sensor 6 has been operating beyond a predetermined permissible period of time after the end of shifting operation, the motor drive portion 47 limits the time of continuous power supply to the motor 3 to be within a predetermined period of time.

In this way, wasteful power consumption can be avoided, and damages to the motor 3 and other operating components can be prevented.

Figure 8:
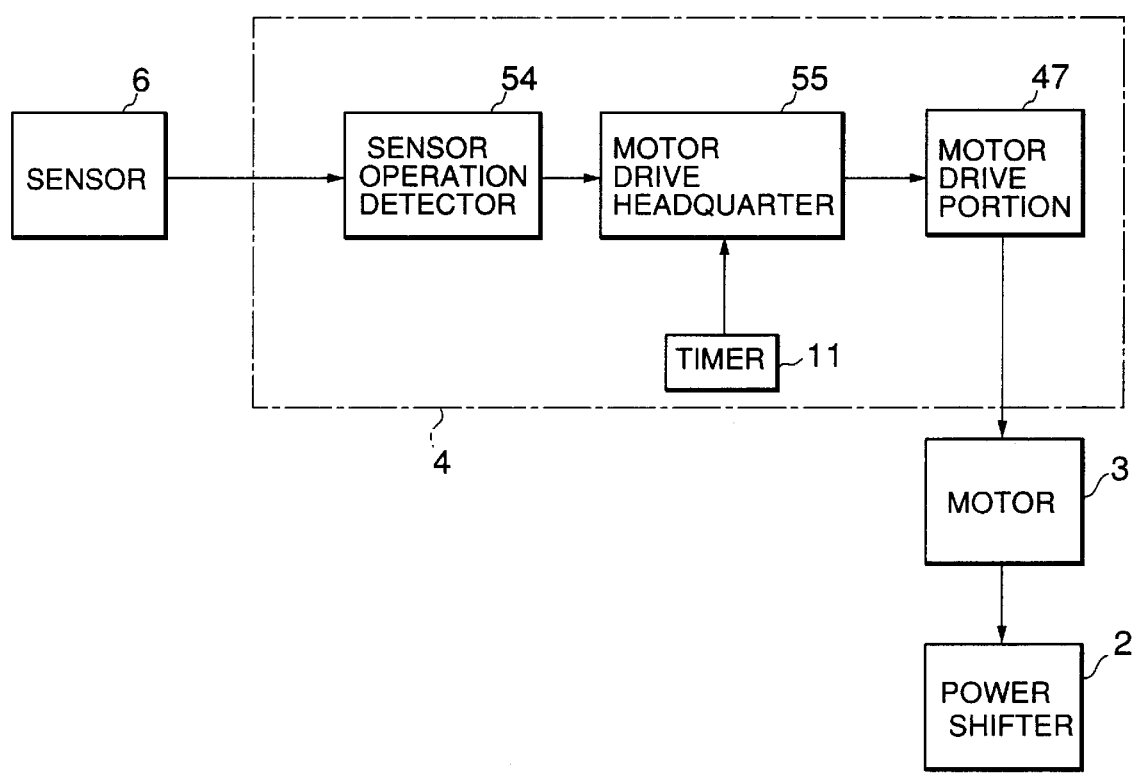
FIG. 8 is a block diagram showing a fourth embodiment of the power shifter control system according to the invention.

FIG. 8 is a block diagram showing a fourth embodiment of the power shifter control system. Referring to the figure, an output signal from a sensor 6 in the power shifter 2 is supplied to a sensor operation detector 54. The sensor operation detector 54 generates a motor drive on-off signal from the voltage value of output signal of the sensor 6, and supplies this signal to a motor drive headquater 55. Specifically, in the forward rotation of the motor 3, the sensor operation detector 54 supplies a motor drive "on" signal to the motor drive headquater 55 when the sensor output voltage exceeds the point B shown in FIG. 10. In the reverse rotation of the motor 3, the detector 54 supplies a motor drive "on" signal to the motor drive headquater 55 when the sensor output voltage becomes lower than the point B.

When receiving the motor drive "on" signal, the motor drive headquater 55 supplies an output signal to a motor drive portion 47 and also starts a timer 11. Even when the output voltage of the sensor 6 has not been restored to a motor drive "off" range, the motor drive headquarter 55 supplies, after the lapse of a predetermined period of time from an instant of detection of output signal from the timer 11, a motor stop signal to the motor drive portion 47 and forcibly stops the motor 3. In this way, wasteful power consumption and damages to the motor and other components are prevented. When the output voltage of the sensor 6 is restored to be in a motor drive "off" range, the motor drive headquarter 55 is restored to origin.

I claim:

1. A power shifter control system for controlling the operation of power shifter (2), which transmits a shifting action coupled from a change lever (1) via a shift cable (5) to the power shifter (2) and provides the amplified shifting action force with a motor (3) of the power shifter (2) to a transmission, said power shifter control system comprising a shift position sensor (10) for detecting a shift position of shifting operation by said power shifter (2), a select sensor (13) for detecting a select position selected by a select lever (15), a transmission rotational rate detector (12) for detecting rotational rate of said transmission, an engine rotational rate detector (14) for detecting engine rotational rate, and a controller (4) for controlling the driving of said motor (3) according to out put signals provided from said shift position sensor (10), said select sensor (13), said transmission rotational rate detector (12) and said engine rotational rate detector (14), and the controller (4) includes a possible down-shifting speed change stage number range calculator (45) for calculating a possible down-shifting speed change stage number range in a permissible rotational rate range of the engine according to said transmission rotational rate, said engine rotational rate and output signals of said shift position sensor (10) and select sensor (13) representing the shifted speed range stage, and a shift operation controller (46) for providing a shift operating force in the direction opposite to shifting direction to said motor (3) via a motor drive portion (47) thereof when the shifted speed change stage detected by said shift position sensor (10) and said select sensor (13) is not in a possible down-shifting speed change stage number range but in the another speed change stage.

2. A power shifter control system for controlling the operation of a power shifter (2), which transmits a shifting action coupled from a change lever (1) via shift cable (5) to the power shifter (2) and provides the amplified shifting action force with a motor (3) of the power shifter (2) to said transmission, said power shifter control system comprising a displacement sensor (6) for detecting displacement of a power shifter (2), a shift position sensor (10) for detecting a shifted position brought about by said power shifter (2), and a controller (4) for controlling the driving of said motor (3) according to output signals provided from said sensors (6) (10), said controller (4) including a shift suitability controller (53) for checking whether said displacement sensor (6) has been operated in a predetermined period of time after the end of shifting operation by comparing the instant of end of shifting operation detected by said shift position sensor (10) and the instant of end of operation of said displacement sensor (6), and a motor drive portion (47) for interrupting power supply to said motor (3) for a predetermined period of time when said shift suitability controller (53) determines that said sensor has been operated.

3. A power shifter control system for controlling the operation of a power shifter (2), which transmits a shifting action coupled from a change lever (1) via a shift cable (5) to the power shifter (2) and provides the amplified shifting action force with a motor (3) of the power shifter (2) to said transmission, said power shifter control system comprising a sensor and a sensor operation detector (54) for providing a motor drive on-off signal according to an output signal provided from said sensor (6), and a motor drive headquarter (55) for providing a motor drive signal to a motor drive portion (47) and also starting a timer (11) in response to a motor drive "on" signal provided from said sensor operation detector (54), and stopping said motor (3) by providing a motor stop signal to said motor drive portion (47) after the lapse of a predetermined period of time from the instant of detection of a signal from said timer (11) even when a signal from said displacement sensor (6) has not been restored to be in a motor drive "off" signal range.

4. The power shifter control system according to claim 1, wherein said motor is an electric motor (3), and further comprising a speed reducer (22) directly coupled to said electric motor (3), a pinion (23) directly coupled to an output shaft of said speed reducer (22), a power rod (24) having a rack (25) meshed with said pinion (23), a control rod (29) extending parallel to said power rod (24), a return spring (74) for returning said control rod (29) to a central position thereof, and a lever (27) mounted on both ends of said control rod (29) and power rod (24), and having a shift cable mounting part (27a) connected to the shift cable (5), said sensor (6) being operative to detect displacement of said control rod (29).

5. The power shifter control system according to claim 2, wherein said motor is an electric motor (3), and further comprising a speed reducer (22) directly coupled to said electric motor (3), a pinion (23) directly coupled to an output shaft of said speed reducer (22), a power rod (24) having a rack (25) meshed with said pinion (23), a control rod (29) extending parallel to said power rod (24), a return spring (74) for returning said control rod (29) to a central position thereof, and a lever (27) mounted on both ends of said control rod (29) and power rod (24), and having a shift cable mounting part (27a) connected to the shift cable (5), said sensor (6) being operative to detect displacement of said control rod (29).

6. The power shifter control system according to claim 3, wherein said motor is an electric motor (3), and further comprising a speed reducer (22) directly coupled to said electric motor (3), a pinion (23) directly coupled to an output shaft of said speed reducer (22), a power rod (24) having a rack (25) meshed with said pinion (23), a control rod (29) extending parallel to said power rod (24), a return spring (74) for returning said control rod (29) to a central position thereof, and a lever (27) mounted on both ends of said control rod (29) and power rod (24), and having a shift cable mounting part (27a) connected to the shift cable (5), said sensor (6) being operative to detect displacement of said control rod (29).

7. The power shifter control system according to claim 1, wherein said motor is an electric motor (3), and further comprising a speed reducer (22) directly coupled to said electric motor (3), a pinion (23) directly coupled to an output shaft of said speed reducer (22), a hollow power rod (78) having a rack (25) meshed with said pinion (23), a control rod (29) mounted in the inner surrounding of said power rod (78), a return spring (74) mounted on said hollow power rod (78) for returning said control rod (29) to a central position thereof, and a lever (80) mounted on an end of said control rod (29) and having a shift cable mounting part (80a), said sensor (6) being operative to detect displacement of said control rod.

8. The power shifter control system according to claim 2, wherein said motor is an electric motor (3), and further comprising a speed reducer (22) directly coupled to said electric motor (3), a pinion (23) directly coupled to an output shaft of said speed reducer (22), a hollow power rod (78) having a rack (25) meshed with said pinion (23), a control rod (29) mounted in the inner surrounding of said power rod (78), a return spring (74) mounted on said hollow power rod (78) for returning said control rod (29) to a central position thereof, and a lever (80) mounted on an end of said control rod (29) and having a shift cable mounting part (80a), said sensor (6) being operative to detect displacement of said control rod.

9. The power shifter control system according to claim 3, wherein said motor is an electric motor (3), and further comprising a speed reducer (22) directly coupled to said electric motor (3), a pinion (23) directly coupled to an output shaft of said speed reducer (22), a hollow power rod (78) having a rack (25) meshed with said pinion (23), a control rod (29) mounted in the inner surrounding of said power rod (78), a return spring (74) mounted on said hollow power rod (78) for returning said control rod (29) to a central position thereof, and a lever (80) mounted on an end of said control rod (29) and having a shift cable mounting part (80a), said sensor (6) being operative to detect displacement of said control rod.

* * * * *